United States Patent

[11] 3,581,549

[72] Inventors Kiyonori Nakamura
Kawasaki;
Satoru Mochida, Yokohama, both of, Japan
[21] Appl. No. 781,504
[22] Filed Dec. 5, 1968
[45] Patented June 1, 1971
[73] Assignee Fuji Electronics Co., Ltd.,
Kawasaki, Japan
[32] Priority Feb. 6, 1968, Mar. 13, 1968
[33] Japan
[31] 6,891/68 and 15,904/68

[54] DEVICE FOR SPREADING LEAD WIRES OF AN INTEGRATED CIRCUIT MOUNTING STEM

5 Claims, 4 Drawing Figs.

[52] U.S. Cl. .......... 72/399, 140/147, 29/203
[51] Int. Cl. .......... B21d 41/00
[50] Field of Search .......... 140/147, 1; 29/203 P, 203 S, 203 V, 203 MW, 203 J, 203 B; 72/402, 121, 399; 78/14, 15

[56] References Cited
UNITED STATES PATENTS

| | | | |
|---|---|---|---|
| 2,390,139 | 12/1945 | Vasselli | 29/203P |
| 3,439,402 | 4/1969 | Chin et al. | 140/147 |
| 3,447,224 | 6/1969 | Helda | 140/147 |

*Primary Examiner*—Charles W. Lanham
*Assistant Examiner*—Michael J. Keenan
*Attorney*—Stevens, Davis, Miller & Mosher

ABSTRACT: A device for spreading lead wires of an integrated circuit mounting stem comprising hooked bars formed with hooks at their forward ends, a fixed member pivotally mounting said hooked bars at their bases, and means for pivotally moving said hooked bars from a position in which said hooked bars are mounted radially with said hooks at their forward ends forming a relatively small circle into a position in which said hooks form a relatively large circle.

PATENTED JUN 1 1971 3,581,549

INVENTORS
KIYONORI NAKAMURA
SATORU MOCHIDA

BY Stevens, Davis, Miller & Mosher

ATTORNEYS

DEVICE FOR SPREADING LEAD WIRES OF AN INTEGRATED CIRCUIT MOUNTING STEM

The present invention relates to devices for spreading lead wires of an integrated circuit mounting stem, and in particular the invention is concerned with a device for spreading at a high efficiency about 10 lead wires of an integrating circuit mounting stem into a conical form so that the lead wires can be connected to testers while being prevented from contacting each other.

In general, integrated circuits each mounted on a stem are tested by means of a tester one by one. Ten odd lead wires projecting from the underside of an integrated circuit mounting stem are formed in a bundle and maintained in contact with one another immediately after production. It is necessary, therefore, to spread these lead wires apart before they are connected to testers.

It has hitherto been customary to perform a lead wire spreading operation manually by using a pincette to spread each of the lead wires by hand. This costs a lot of labor and time, and the efficiency of operation is very low. This has resulted in an increased production cost of integrated circuits.

The present invention can obviate the aforementioned disadvantage of the prior art by providing improved means for spreading apart lead wires of integrated circuit mounting stems.

Accordingly, an object of the present invention is to provide a device for spreading lead wires of an integrated circuit mounting stem which permits to readily and quickly spread apart such lead wires.

Another object of the invention is to provide a device for spreading lead wires of an integrated circuit mounting stem which permits to connect the lead wires to testers simultaneously with spreading apart the lead wires.

Still another object of the invention is to provide a device for spreading lead wires of an integrated circuit mounting stem which comprises bars equal in number to said lead wires and each formed with a hooked forward end, said bars being mounted at their bases on a circle substantially corresponding to a circle formed by the roots of said lead wires and disposed such that the hooked forward ends thereof are disposed in the center of said circle and directed laterally in the same direction, and means for pivotally moving said hooked bars simultaneously.

Additional objects and advantages of the invention will become apparent from consideration of the description set forth hereunder when taken in conjunction with the accompanying drawings, in which.

Figures 1, 2, 3, 4:
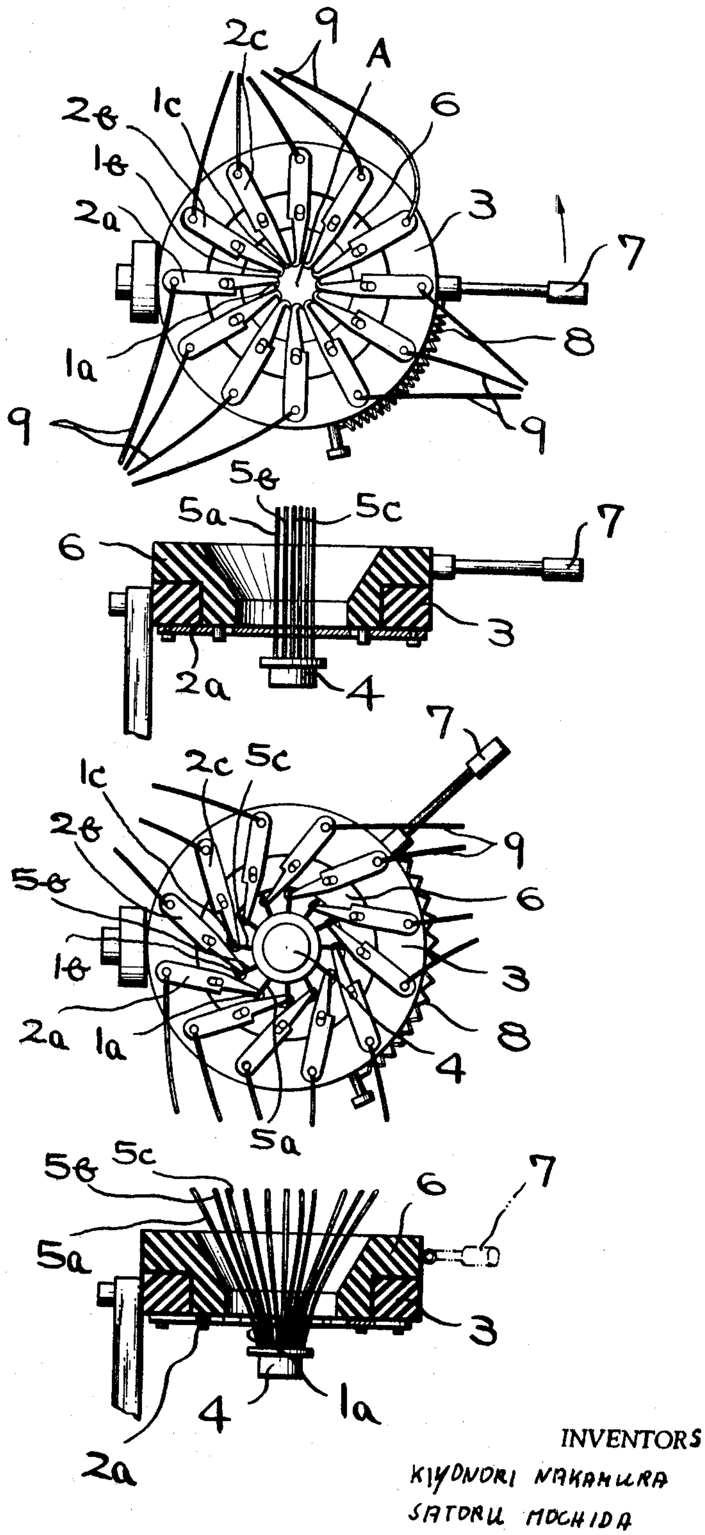
FIG. 1 is a bottom plan view of the device embodying the present invention.
FIG. 2 is a longitudinal sectional front view of the device embodying this invention with a stem being applied thereto.
FIG. 3 is a bottom plan view of the device embodying this invention showing lead wires of a stem being spread apart.
FIG. 4 is a longitudinal sectional front view of the device embodying this invention showing lead wires of a stem being spread apart.

Now, an embodiment of the device which is adapted for use with an integrated circuit mounting stem having 12 lead wires will be explained with reference to the drawings. Twelve hooked bars 2*a*, 2*b*, 2*c*...formed with hooks 1*a*, 1*b*, 1*c*...at their forward ends respectively are mounted by pins at their bases on the end surface of a fixed insulating cylinder 3 in positions spaced equidistantly from one another, said hooks 1*a*, 1*b*, 1*c*...being directed laterally in the same direction and said positions in which said hooked bars are mounted at their bases forming a circle slightly smaller than a circle formed by the roots of lead wires 5*a*, 5*b*, 5*c*...of a stem 4.

Fitted in said fixed cylinder 3 is a rotary cylinder 6 which has its end surface being disposed in the same plane as the end surface of the fixed cylinder 3. The hooked bars 2*a*, 2*b*, 2*c*...are formed in their middle portions with slots which receive therein bosses formed on the bottom surface of the rotary cylinder 6.

A handle 7 and a restoring spring 8 are attached to the rotary insulating cylinder 6.

The operation of the device embodying this invention will now be explained. Normally, the rotary cylinder 6 is urged by the restoring spring 8 and disposed in a normal position as shown in FIGS. 1 and 2, with the hooked bars 2*a*, 2*b*, 2*c*...bein g disposed radially and the hooks 1*a*, 1*b*, 1*c*...being disposed in the center of the circle formed by the bases of the bars.

In applying a stem to the device, the handle 7 is turned slightly to rotate the cylinder 6 through a small angle so that the diameter of a circular opening A formed by the forward ends of the hooked bars 2*a*, 2*b*, c...can be slightly increased.

Then, the lead wires 5*a*, 5*b*, 5*c*...formed into a bundle with the forward ends of the lead wires being in contact with one another are inserted into said circular opening A from below. After the upper surface of the stem 4 is brought into contact with the hooked bars 2*a*, 2*b*, 2*c*...,the handle 7 is released. The cylinder 6 is restored to its original normal position by the biasing force of the spring 8, thereby reducing the diameter of the circular opening A.

If the stem 4 is pulled axially thereof in this state, the lead wires 5*a*, 5*b*, 5*c*...will be caught by the hooks 1*a*, 1*b*, 1*c*...resp ectively. Then, by turning the handle 7 greatly so as to rotate the cylinder 6 through a larger angle than before, the hooked bars 2*a*, 2*b*, 2*c*...which are mounted by pins at their bases on the fixed cylinder 3 can be simultaneously moved in pivotal motion, so that the hooks 1*a*, 1*b*, 1*c*...at their forward ends are simultaneously moved laterally so as to increase the diameter of a circle formed by the forward ends of the hooked bars 2*a*, 2*b*, 2*c*...as shown in FIG. 3. Accordingly, the bundle of lead wires 5*a*, 5*b*, 5*c*...caught by said hooks are pulled outwardly into a conical form, whereby the forward ends of the lead wires can be released from contact with one another.

It is to be noted that the hooked bars 2*a*, 2*b*, 2*c*...are restrained against contact with one another and they are mounted on the cylinders 3 and 6 made of an insulating material, so that the hooked bars 2*a*, 2*b*, 2*c*...are electrically insulated from one another.

The hooked bars 2*a*, 2*b*, 2*c*...are connected to testers (not shown) by lead wires 9, so that the integrated circuit mounted on the particular stem 4 is connected to the testers for conducting testing.

From the foregoing description, it will be appreciated that the device according to this invention permits to spread apart the lead wires of an integrated circuit mounting stem so that they may be restrained against contact with one another and, at the same time, to automatically connect the integrated circuit mounted on said stem to testers. Thus, the two-step operation of first spreading apart lead wires of a stem by a spreader and then removing the stem from the spreader for connection to testers can be eliminated. The end can be attained in a single step readily and quickly. The device embodying the present invention permits to achieve a markedly higher efficiency in operation than the conventional method in which a pincette is used to spread apart one lead wire after another and then the lead wires are connected to testers.

What we claim is:

1. A device for spreading lead wires of an integrated circuit mounting stem comprising hooked bars equal in number to lead wires of an integrated circuit mounting stem and arranged radially, each of said hooked bars being formed with a hook at its forward end, a fixed number pivotally mounting said hooked bars at their bases, means engaging said hooked bars substantially at their central portion, and means for pivotally moving said hooked bars from a position in which said hooked bars are mounted radially with the hooks thereof forming a relatively small circle into a position in which said hooked bars are disposed nonradially with the hooks thereof forming a relatively large circle.

2. A device as claimed in claim 1 wherein said member is a fixed cylinder and said means is a movable cylinder fitted in said fixed cylinder and having pins each being adapted to be received in a slot formed in substantially the central portion of each of said hooked bars.

3. A device as claimed in claim 2 wherein said two cylinders are connected together by a restoring spring.

4. A device as claimed in claim 2 in which a handle is attached to said movable cylinder.

5. A device as claimed in claim 1 wherein said hooked members are electrically insulated from one another.